United States Patent
Leschnik et al.

(10) Patent No.: US 10,377,426 B2
(45) Date of Patent: Aug. 13, 2019

(54) HOOD HINGE FOR A MOTOR VEHICLE AND A MOTOR VEHICLE

(71) Applicant: GM GLOBAL TECHNOLOGY OPERATIONS LLC, Detroit, MI (US)

(72) Inventors: Steffen Karl Leschnik, Ruesselsheim (DE); Wolfgang Rasel, Ruesselsheim (DE); Christian Pietrasch, Ruesselsheim (DE); Bernd Klein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/682,677

(22) Filed: Aug. 22, 2017

(65) Prior Publication Data
US 2018/0057068 A1 Mar. 1, 2018

(30) Foreign Application Priority Data
Aug. 25, 2016 (DE) .................. 10 2016 010 316

(51) Int. Cl.
*B62D 25/12* (2006.01)
*B60R 21/38* (2011.01)
*B62D 25/10* (2006.01)

(52) U.S. Cl.
CPC .............. *B62D 25/12* (2013.01); *B60R 21/38* (2013.01); *B62D 25/105* (2013.01)

(58) Field of Classification Search
CPC ...... B62D 25/10; B62D 25/105; B62D 25/12; B60R 21/38; E05B 77/08
See application file for complete search history.

(56) References Cited

U.S. PATENT DOCUMENTS

| 6,257,657 | B1 * | 7/2001 | Sasaki | B60R 21/013 180/69.21 |
| 10,100,565 | B2 * | 10/2018 | Waskie | B62D 25/12 |
| 2005/0257980 | A1 * | 11/2005 | Green | B60R 21/38 180/274 |
| 2006/0102402 | A1 * | 5/2006 | Birk | B60R 21/38 180/89.17 |
| 2007/0267892 | A1 * | 11/2007 | Scheuch | B60R 21/38 296/187.04 |
| 2009/0072587 | A1 * | 3/2009 | Inomata | B60R 21/38 296/193.11 |
| 2012/0084942 | A1 * | 4/2012 | Mehta | B60R 21/38 16/223 |
| 2017/0282847 | A1 * | 10/2017 | Jenny | B60R 21/38 |

FOREIGN PATENT DOCUMENTS

DE 102010023283 * 12/2011 ............. B62D 25/10

* cited by examiner

*Primary Examiner* — Frank B Vanaman
(74) *Attorney, Agent, or Firm* — Lorenz & Kopf, LLP

(57) ABSTRACT

A hood hinge for a motor vehicle includes a first part attached to a vehicle body part and a second part attached to a front hood. A lift mechanism is configured to extend the attachment parts from a starting position into a cushioning position in which the front hood is raised from the starting position. The lift mechanism includes a first lever coupled to one of the attachment parts and a second lever coupled to the other attachment part for rotation about a rotational axis respectively. The first and second levers are rotatably coupled about a rotational axis. A traction element generates a traction force by extension of the attachment parts, which limits the extension movement thereof.

11 Claims, 4 Drawing Sheets

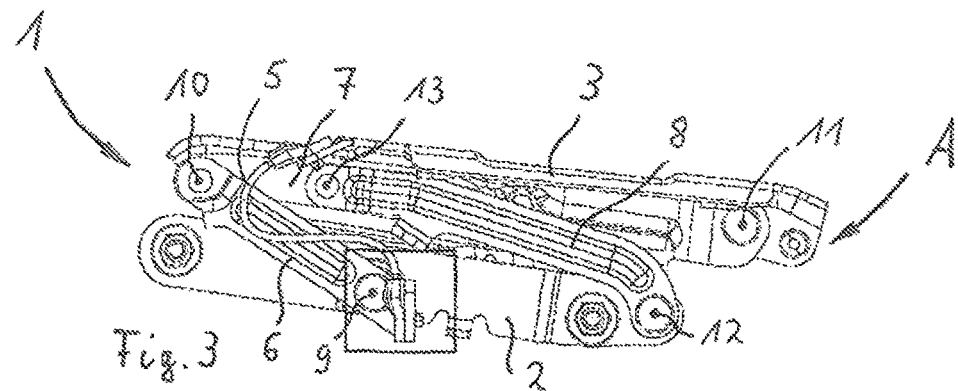
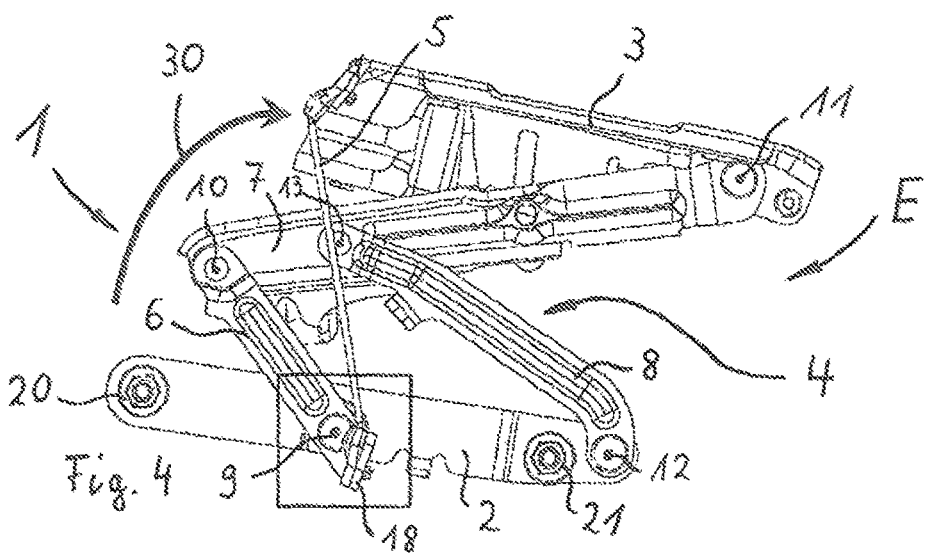
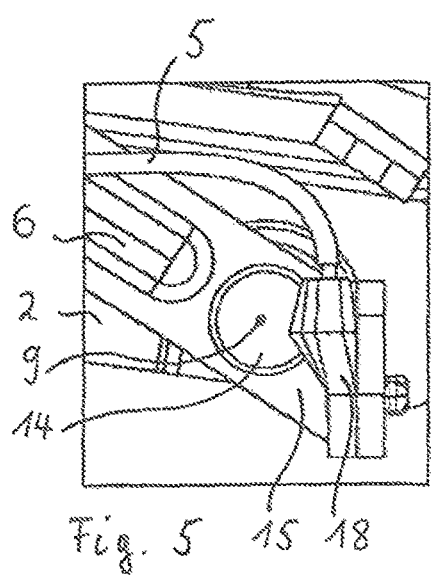
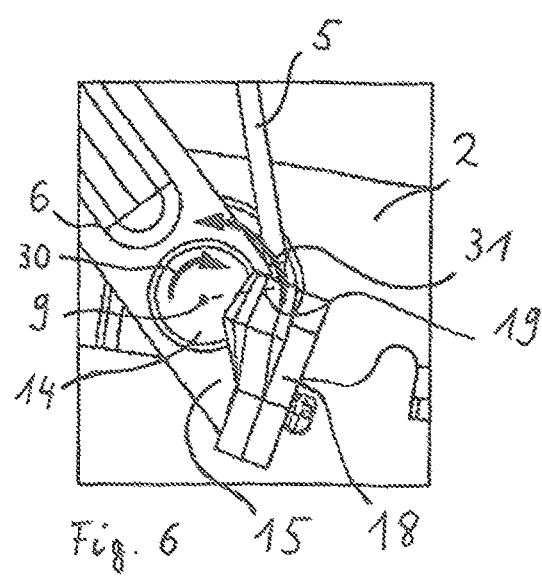

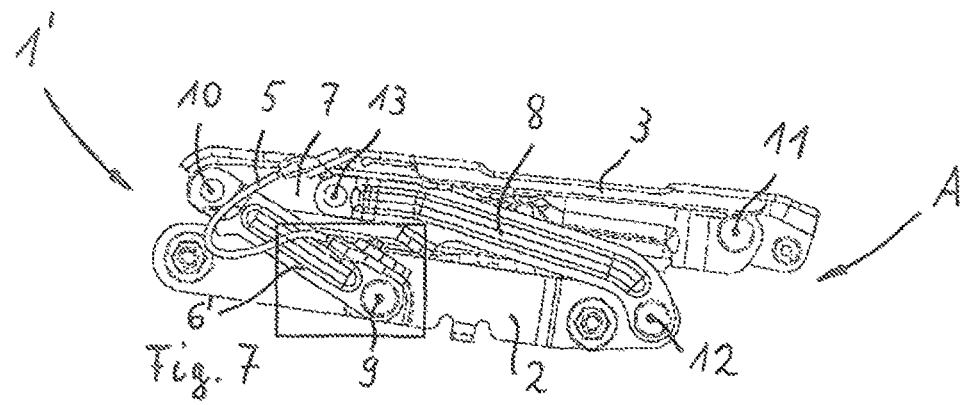
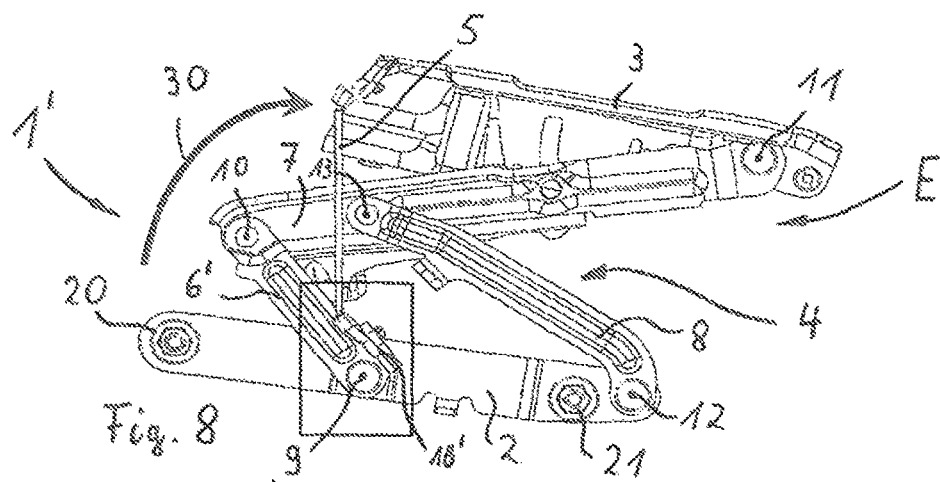
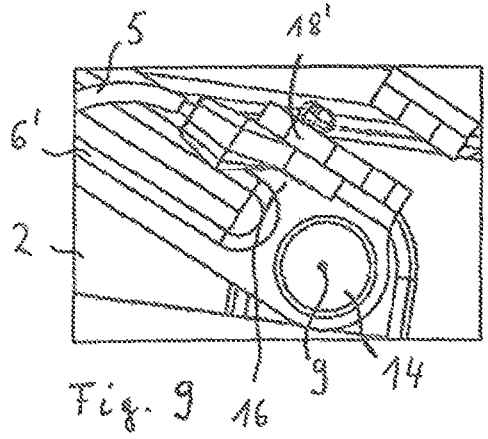
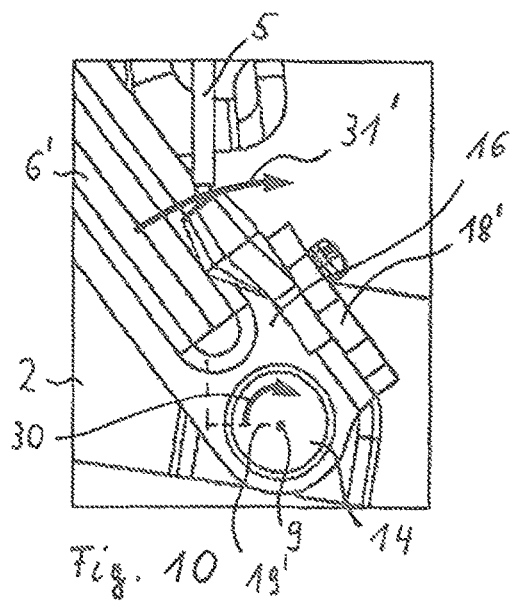

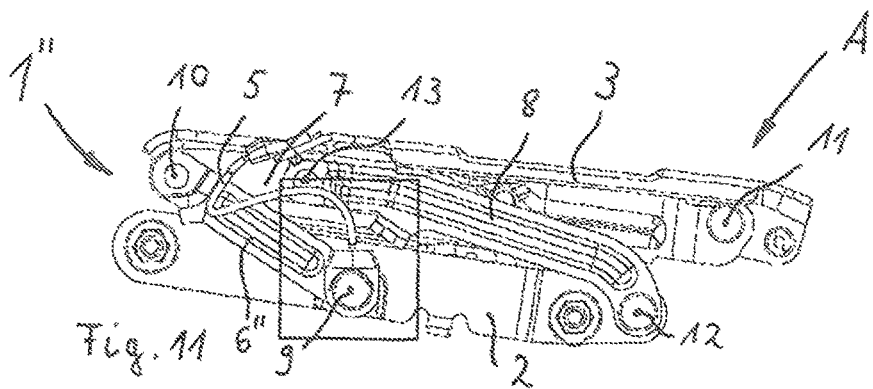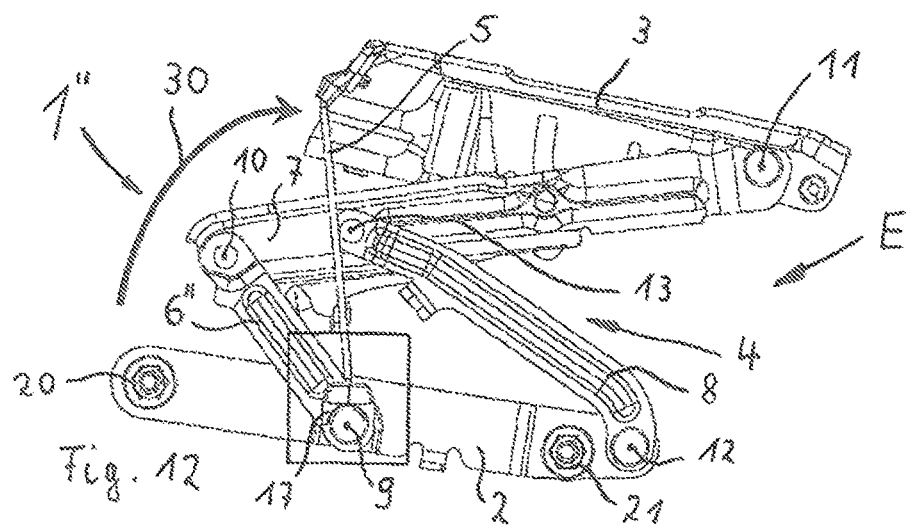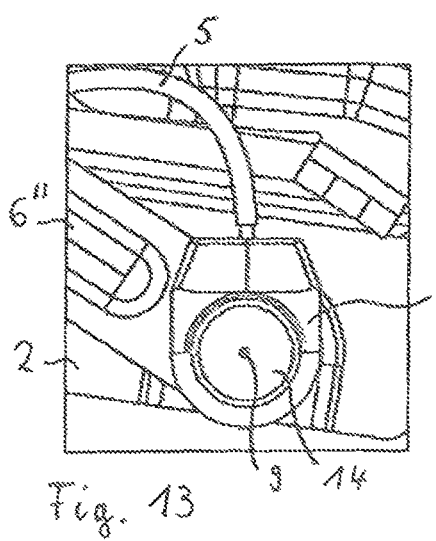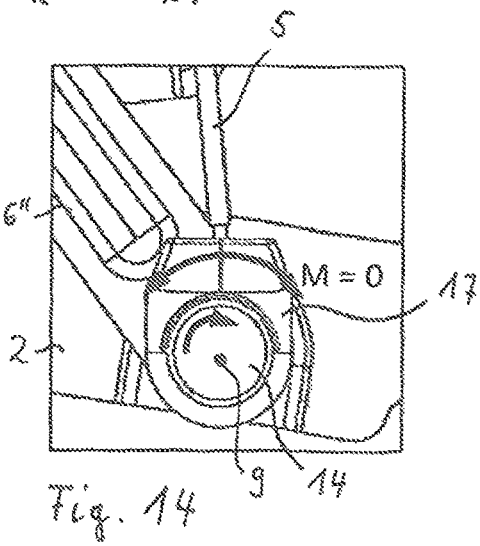

HOOD HINGE FOR A MOTOR VEHICLE AND A MOTOR VEHICLE

CROSS-REFERENCE TO RELATED APPLICATIONS

This application claims priority to German Patent Application No. 102016010316.7, filed Aug. 25, 2016, which is incorporated herein by reference in its entirety.

TECHNICAL FIELD

The invention relates to a hood hinge for a motor vehicle having two attachment parts, of which one attachment part is designed for supporting and/or fastening to a vehicle body part and the other attachment part is designed for supporting and/or fastening to a front hood of the motor vehicle, having a mechanism for extending the attachment parts in relation to one another from a starting position into an end position, to raise the front hood from a starting position into a cushioning position for a pedestrian, for which purpose the mechanism has at least two lever parts, of which one lever part is linked to one of the attachment parts and the other lever part is linked to the other attachment part so they are respectively rotatable about a rotational axis and the lever parts are linked to one another so they are rotatable in relation to one another about a rotational axis, and having a limiting element for limiting an extension movement of the attachment parts in relation to one another. The invention furthermore relates to a motor vehicle having such a hood hinge.

BACKGROUND

A hood hinge of the type claimed here is known from DE 10 2010 023 283 A1. The hood hinge has a function in the event of a collision of the motor vehicle with a pedestrian. This is because it permits raising of the front hood from a starting position into a cushioning position for the pedestrian, for example, to moderate the force of the impact of the pedestrian by the front hood. For this purpose, the hood hinge is typically a component of a pedestrian protection system of the motor vehicle, which is activated, for example, via sensorial recognition of an imminent collision or an already occurring collision with a pedestrian, and then causes raising of the front hood, for example, by an actuator.

In the development or refinement of such pedestrian protection systems, efforts have been made to cause the extension of the front hood into the cushioning position for the pedestrian as rapidly as possible with respect to time. However, this is frequently made more difficult in that in the end phase of the extension procedure, when a limiting element which limits the extension movement becomes active, the front hood is excited into oscillations because of its mass inertia and the kinetic energy acting during the extension procedure. The desired cushioning position is then only reached after an oscillation-related time delay.

SUMMARY

One embodiment of the invention is based on the object of proposing at least one possibility for being able to positively influence the raising movement of the front hood in the event of a collision of a motor vehicle with a pedestrian and raising of the front hood of the motor vehicle linked thereto as a pedestrian protection measure, in order to counteract possible oscillations of the front hood.

According to one embodiment of the invention, a hood hinge for a motor vehicle is provided, which has two attachment parts, of which one attachment part is designed for supporting and/or fastening to a vehicle body part and the other attachment part is designed for supporting and/or fastening to a front hood of the motor vehicle. The hood hinge has a mechanism, which is operationally connected to the attachment parts in particular and is designed for extending the attachment parts in relation to one another from a starting position into an end position, to raise the front hood from a starting position into a cushioning position for a pedestrian. For this purpose, the mechanism has at least two lever parts, of which one lever part is linked to one of the attachment parts and the other lever part is linked to the other attachment part so they are respectively rotatable about a rotational axis and the lever parts are linked to one another so they are rotatable in relation to one another about a rotational axis. Furthermore, the hood hinge has a limiting element for limiting an extension movement of the attachment parts in relation to one another.

The limiting element is designed as traction means, which is linked on one side in relation to one of the attachment parts and on the other side in relation one of the lever parts, so that a traction force is generated by the extension of the attachment parts in relation to one another, which limits the extension movement of the attachment parts. A use of the hood hinge in a broad palette of different motor vehicles is thus possible. This is because an extension movement of the front hood in the event of a collision of the motor vehicle with a pedestrian may be influenced in a simple and flexible manner by the hood hinge depending on the requirement, for example, by the respective design conditions, in particular the respective design of the front hood, for example, to counteract possible oscillations of the front hood in the end phase of the extension movement. For this purpose, it is provided, inter alia, that the limiting element is linked in relation to one of the lever parts. These lever parts make a rotational movement about at least one of the associated rotational axes in the course of the extension movement of the front hood, so that, if needed, the kinetic energy from the rotational movement can be used to positively influence the extension procedure. For example, it is provided that the limiting means designed as the traction means is connected on one side to the one attachment part, for example, directly or indirectly via an interconnected component, and on the other side engages directly or indirectly on the one lever part via an intermediate element connected thereto in a rotationally-fixed manner.

According to one embodiment of the invention, the limiting element is linked in relation to the one lever part at a distance to the rotational axes thereof. The linkage point of the limiting element is thus at a distance to the rotational axes of the lever part. This distance acts as a lever when the attachment parts of the hood hinge execute an extension movement in relation to one another and a pivot movement of the lever parts in relation to one another thus occurs. A torque is induced by the lever when the extension movement of the attachment parts in relation to one another is advanced enough that the limiting element becomes active and limiting of the extension movement is initiated.

For example, the limiting element is linked on a material section of the one lever part, in particular is linked directly or indirectly via a component held in a rotatable manner in relation to the material section, wherein the material section protrudes outward away from one of the rotational axes of the one lever part. For example, the material section protrudes outward away from one of its rotational axes in longitudinal extension of the lever part. Alternatively, the limiting element can be linked on a fastening element which is connected in a rotationally-fixed manner to the lever part, and which protrudes outward away from one of the rotational axes of the one lever part. The material section or fastening element protruding outward away from one of the rotational axes is to be understood in particular to mean that the material section or the fastening element, respectively, is arranged outside the region between the two rotational axes. It is decisive for the arrangement of the material section or the fastening element that the material section or the fastening element, respectively, protrudes outward away from one of the rotational axes such that an extension movement of the attachment part in relation to one another generates a torque when the limiting element exerts a limiting force acting on at least one of the attachment parts.

A torque oriented opposite in comparison thereto is generated according to one possible other embodiment of the invention if the limiting element is linked on a material section of the one lever part at a linkage point which is arranged between the rotational axes of the one lever part. Alternatively, the limiting element can be linked to a fastening element, which is connected in a rotationally-fixed manner to the one lever part, at a linkage point which is arranged between the rotational axes of the one lever part.

By way of the limiting element linking or engaging on the lever part at a distance to the rotational axes thereof, a torque is generated when the attachment parts are extended in relation to one another enough that the limiting element becomes active and exerts its limiting force on at least one of the attachment parts. This torque acts to assist the rotational movement on the lever part when the torque acts in the direction of the rotational direction of the lever part during the extension of the hood hinge. The torque, in contrast, brakes the rotational movement of the lever part during the extension of the hood hinge when the torque is oriented opposite to the rotational direction of the lever part. Depending on whether the linkage point for the limiting element is between the rotational axes of the lever part or is associated with the material section protruding outward away from one of the rotational axes, such an assisting or braking action on the rotational movement of the lever part and therefore on the end phase of the extension movement of the hood hinge is possible when the limiting element exerts its limiting force. The braking or assisting torque is only then generated by the limiting element.

Alternatively, according to a further embodiment of the invention, the limiting element can be linked so it is rotatable about one of its rotational axes on the one lever part. The limiting element can be linked so it is rotatable about one of its rotational axes on the one lever part directly or indirectly via an intermediate element connected in a rotationally-fixed manner thereto. For example, the intermediate element of the one lever part is arranged coaxially with respect to the one rotational axis and the limiting element is associated with a movement element, in particular attached thereon, which is rotatable about the rotational axis and at least partially encompasses the intermediate element coaxially with respect to the one rotational axis and so it is rotatable in relation to the intermediate element. An attachment of the limiting element on the one lever part is thus implemented in a technically simple manner, without a torque acting on the lever part being generated by the limiting element, when the limiting element exerts its limiting force on the at least one attachment part.

The intermediate element can be an axial section or another extension arranged in a rotationally-fixed manner on the one lever part, the center axis of which is coincident with the one rotational axis. The fastening element can also be an eye-shaped terminus part. The hood hinge is thus to be implemented in a technically simple manner.

It is thus suggested that one of the lever parts on which the limiting element engages is the lever part which is linked to the attachment part formed for supporting and/or fastening to the vehicle body part. Good lever relationships thus result for the limiting element, to limit the extension movement of the attachment parts in relation to one another.

The measure, according to which, according to a further embodiment of the invention, the limiting element is aligned on the lever part in respect to the rotational axis about which the lever part is linked so it is rotatable on the attachment part formed for support and/or fastening to the vehicle body part, is also aimed in this direction.

Furthermore, it is thus suggested that one of the attachment parts to which the limiting element is operationally connected is the attachment part designed for supporting and/or fastening to the front hood. A direct introduction of the limiting force exerted by the limiting element into the target component thus takes place, namely the attachment part used for extending the front hood.

The limiting element can be a cable pull, a tension rod which can be buckled, a chain, or a belt or can at least have such a component. The limiting element is formed in a technically simple and stable manner.

According to a further embodiment of the invention, the mechanism is or has a multiple joint, in particular a multiple pivot joint, which is designed for pivoting the front hood from a closed position into an open position. The mechanism thus has a double function. On the one hand, it is used for pivoting the front hood and, on the other hand, it is used in case of a crash with a pedestrian for extending the front hood into the cushioning position for the pedestrian.

For example, the mechanism has a further lever part, which is linked so it is rotatable about an axis of rotation on one of the attachment parts, on the one hand, and is linked so it is rotatable about an axis of rotation on the lever part which is linked so it is rotatable on the other of the attachment parts, on the other hand. The mechanism is thus embodied as robust and stable, to be able to pivot the front hood from the closed position into the open position and, on the other hand, in case of a crash with a pedestrian, to extend the front hood into the cushioning position for the pedestrian.

Furthermore, the invention comprises a motor vehicle having at least one vehicle body part, a front hood, and at least one hood hinge, as described above, by means of which the front hood is attached to the vehicle body part. The front hood can be the above-described front hood. The vehicle body part can be the above-described vehicle body part.

Further goals, advantages, features, and possible applications of the present invention result from the following description of multiple exemplary embodiments on the basis of the drawing. In this case, all features which are described and/or illustrated in the figures form the subject matter of the present invention per se or in any arbitrary reasonable combination, also independently of the summary thereof in the claims or what they refer to.

BRIEF DESCRIPTION OF THE DRAWINGS

The present invention will hereinafter be described in conjunction with the following drawing figures, wherein like numerals denote like elements.

FIG. 3 shows a possible embodiment of a hood hinge, which is usable for extending the front hood of the motor vehicle according to FIG. 1, in a starting state as a side view, FIG. 4 shows the hood hinge according to FIG. 3 in an extended state, FIG. 5 shows an enlarged illustration of the hood hinge of FIG. 3 in the region of an attachment point of a limiting element, FIG. 6 shows an enlarged illustration of the hood hinge of FIG. 4 in the region of an attachment point of a limiting element, FIG. 7 shows a further possible embodiment of a hood hinge, which is usable for extending the front hood of the motor vehicle according to FIG. 1, in a starting state as a side view, FIG. 8 shows the hood hinge according to FIG. 7 in an extended state, FIG. 9 shows an enlarged illustration of the hood hinge of FIG. 7 in the region of an attachment point of a limiting element, FIG. 10 shows an enlarged illustration of the hood hinge of FIG. 8 in the region of an attachment point of a limiting element, FIG. 11 shows a further possible embodiment of a hood hinge which is usable for extending the front hood of the motor vehicle according to FIG. 1, in a starting state as a side view, FIG. 12 shows the hood hinge according to FIG. 11 in an extended state, FIG. 13 shows an enlarged illustration of the hood hinge according to FIG. 11 in the region of an attachment point of a limiting element, and FIG. 14 shows an enlarged illustration of the hood hinge of FIG. 12 in the region of an attachment point of a limiting element.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
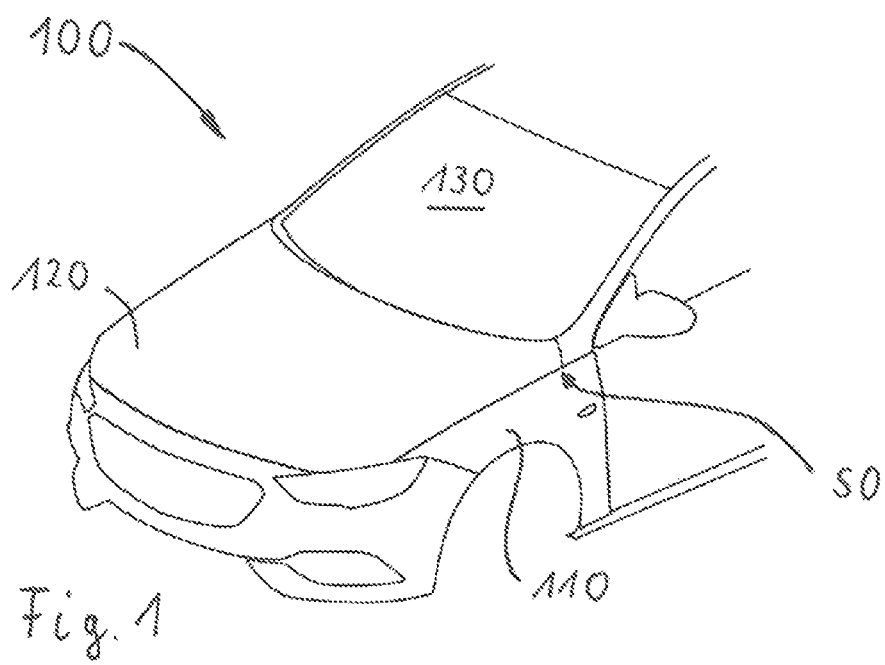
FIG. 1 shows a possible embodiment of a motor vehicle having an extendable front hood in a perspective illustration, wherein the front hood is provided in a starting position.

FIG. 1 shows—in a schematic illustration—a possible embodiment of a motor vehicle 100 as a portion in the region of the front section. The motor vehicle 100 is shown with its front hood 120. In FIG. 1, the front hood 120 is located in a starting position S0, in which the front hood 120 is closed. The front hood 120 rests on the lateral fenders, for example. The lateral fenders are referred to by way of example as a vehicle body part 110. The motor vehicle 100 has a pedestrian protection system (not shown in FIG. 1), by means of which the front hood 120 is activated, for example, by sensorial recognition of an imminent collision or an already occurring collision with the pedestrian and then, for example, raising of the front hood 120 takes place by an actuator. The raising of the front hood 120 occurs, for example, in the region of the rear end of the front hood 120, which faces toward the front hood 130 of the motor vehicle 100.

Figure 2:
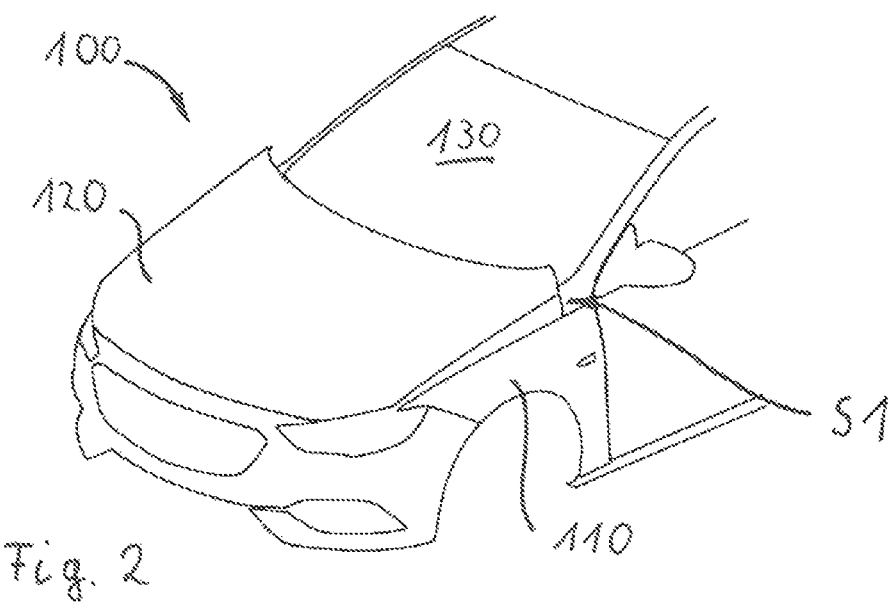
FIG. 2 shows the motor vehicle according to FIG. 1, wherein the front hood thereof is located in a cushioning position for a pedestrian.

FIG. 2 shows the motor vehicle 100 with extended front hood 120. The front hood 120 is located there in a cushioning position S1, which is reached when the extension movement of the front hood 120 is completed. In the cushioning position S1, the front hood 120 is raised in the end position for cushioning a pedestrian colliding with the motor vehicle 100.

FIG. 3 shows a possible embodiment of a hood hinge 1, which is, for example, a component of the pedestrian protection system of the motor vehicle 100 according to FIGS. 1 and 2 and is used to raise the front hood 120 from the starting position S0 into the cushioning position S1.

The hood hinge 1 has two attachment parts 2 and 3, of which one attachment part 2 is designed for support and/or attachment to a vehicle body part, for example, the vehicle body part 110, and the other attachment part is designed for support and/or attachment to a front hood, for example, the front hood 120. For example, the attachment part 2 has at least one, preferably two attachment points 20, 21 for attachment to the vehicle body part 110. The hood hinge 1 furthermore has a mechanism which is operationally connected to the attachment parts 2, 3 and is designed for extending the attachment parts 2, 3 in relation to one another from a starting position A into an end position E, to raise the front hood 120 from the starting position S0 into the cushioning position S1. In FIG. 3, the hood hinge 1 is shown in the starting position A. FIG. 4 shows the hood hinge 1 in the end position E.

The mechanism 4 has at least two lever parts 6, 7, of which one lever part 6 is linked so it is rotatable on one of the attachment parts 2, 3, in particular the attachment part 2, and the other lever part 7 is linked so it is rotatable on the other of the attachment parts 2, 3, in particular the attachment part 3, about a rotational axis 9 or 11, respectively, and the lever parts 6, 7 are linked so they are rotatable in relation to one another about a rotational axis 10. The mechanism 4 can be formed by a multiple pivot joint, for example, a fourfold pivot joint, or can have such a joint, which is designed for pivoting the front hood 120 from a closed position into an open position. For this purpose, the mechanism 4 can have a further lever part 8, which is linked on one side to one of the attachment parts 2, 3, in particular the attachment part 2, so it is rotatable about a rotational axis 12, and is linked on the other side to the lever part 7 so it is rotatable about a rotational axis 13.

As is apparent from FIGS. 3 and 4, the hood hinge 1 has a limiting element 5 for limiting the extension movement of the attachment parts 2 and 3 in relation to one another. For this purpose, the limiting element 5 exerts a limiting force on at least one of the attachment parts 2, 3, for example, when the limiting element 5 is activated, i.e., the attachment parts 2 and 3 are moved in relation to one another into an extension position such that the cushioning position S1 is reached or one is located in the end phase of the extension movement.

The limiting element 5 is designed as a traction means, which is operationally connected on one side to one of the lever parts 2, 3, in particular the lever part 3, and is linked on the other side to one of the lever parts 6, 7, in particular the lever part 6, so that a traction force is generated by the extension of the attachment parts 2, 3 in relation to one another, which limits the extension movement of the attachment parts 2, 3. The traction means can be a cable pull, a tension rod which can be buckled, a chain, or a belt.

FIG. 5 shows an enlarged portion of the illustration of the hood hinge 1 of FIG. 3 in the region on which the limiting element 5 is linked on the lever part 6. FIG. 6 shows an enlarged portion of the hood hinge 1 shown in FIG. 4 in the same manner in the region of the lever part 6, on which the limiting element 5 is linked. In FIG. 5, the starting position A of the hood hinge 1 is shown and in FIG. 6, the end position E is shown.

As is apparent from FIGS. 5 and 6, the limiting element 5 can engage on the lever part 6 at a distance to the rotational axis 9. In the hood hinge 1, the limiting element 5 engages on a material section 15 of the lever part 6 which protrudes outward away from the rotational axis 9, in particular protrudes outward away from the rotational axis 9 in longitudinal extension of the lever part 6.

For this purpose, a fastening element 18 can be provided, which is, for example, fastened in a rotationally-fixed or rotatable manner on the material section 15 of the lever part 6 and on which the limiting element 5 engages, in particular is attached, in turn. The limiting element 5 is attached via the fastening element 18 to the lever part such that, for example, in the end phase of the extension movement of the attachment parts 2 and 3 in relation to one another, when traction force used for limiting the extension movement of the attachment parts 2 and 3 is generated by the limiting element 5, a distance is generated between the rotational axis 9 and the engagement point of the limiting element 4 in relation to the lever part 6 or in relation to the fastening element 18, so that a lever 19 is formed by the distance, which forms a torque acting about the rotational axis 9 in the course of the rotational movement of the lever part 6.

As is apparent from FIG. 4, the extension movement of the attachment parts 2 and 3 extends through a rotational movement in the rotational axes 9, 10, 11 of the lever parts 6 and 7 in the direction according to the arrow 30. A torque acting opposite to the rotational direction 30 is generated through the material section 15 and the attachment thus caused of the limiting element 5 by the generated lever 19, which extends in the action direction according to the arrow 31. The braking of the extension movement by means of the limiting element 5 is assisted by this torque, by the torque acting in a braking manner on the extension movement.

FIGS. 7 and 8 show a further possible embodiment of a hood hinge 1', once in the starting position A (FIG. 7) and once in the end position E (FIG. 8). Components of the hood hinge 1 of FIGS. 7 and 8, which are identical or functionally identical to components of the hood hinge 1 of FIGS. 3 to 6, are provided with identical reference signs; reference is made in this regard to the description of the hood hinge 1 of FIGS. 3 to 6.

The hood hinge 1' of FIGS. 7 and 8 differs from the hood hinge 1 of FIGS. 3 to 6, inter alia, in that instead of the lever part 6, a lever part 6' is provided, which enables an attachment of the limiting element 5 to the lever part 6' between its rotational axes 9 and 10, as is apparent from FIG. 8, for example. For this purpose, a fastening element 18' can be provided, which is arranged fixedly or movably on the lever part 6 and on which the limiting element 5 engages, in particular is attached, in turn.

FIG. 9 shows a portion of the hood hinge 1' in the starting position A according to FIG. 7 in the region of the attachment of the limiting element 5 on the lever part 6'. FIG. 10 shows the region of the attachment of the limiting element 5 on the lever part 6' in the end position E of the hood hinge 1' according to FIG. 8. Due to the attachment of the limiting element 5 on a material section 16 of the lever part 6' between the rotational axes 9 and 10, a lever 19' is generated when a traction force is built up by the limiting element 5 by the extension of the attachment parts 2 and 3 in relation to one another. This lever 19' results in a torque, the rotational direction of which extends in the direction of the arrow 31', as shown in FIG. 10.

In the case of a rotational direction according to arrow 30 of the lever part 6' during the extension movement of the attachment parts 2 and 3 in relation to one another, a torque which acts in the rotational direction 30 is generated by the lever 19'. The torque generated by the lever 19' therefore assists the extension movement of the attachment parts 2, 3 in relation to one another in the end phase of the extension procedure when the limiting element 5 unfolds its traction force.

FIGS. 11 and 12 show a further possible embodiment of a hood hinge 1" for the motor vehicle, for example, as shown in FIGS. 1 and 2, once in the starting position A (FIG. 11) and once in the end position E (FIG. 12). Components of the hood hinge 1" of FIGS. 11 and 12 which are identical or functionally identical to components of the hood hinge 1 of FIGS. 3 to 6 are provided with identical reference signs; reference is made in this regard to the description of the hood hinge 1 of FIGS. 3 to 6.

The hood hinge 1" of FIGS. 11 and 12 differs from the hood hinge 1 of FIGS. 3 to 6, inter alia, in that instead of the lever part 6, a lever part 6" is now provided, on which the limiting element 5 is attached without generating a lever. For this purpose, the limiting element 5 is linked on the lever part 6" so it is rotatable about the rotational axis 9. This is preferably achieved in that the lever part 6" has an intermediate element 14, which can be, for example, an axle section or another extension arranged in a rotationally-fixed manner on the lever part 6", and the center axis of which is coincident with the rotational axis 9. The intermediate element 14 is thus arranged coaxially with respect to the rotational axis 9.

The limiting element 5 is preferably associated with a movement element 17, in particular attached thereon, which is rotatable about the rotational axis 9 and at least partially encompasses the intermediate element 14 coaxially with respect to the rotational axis 9 and so it is rotatable in relation to the intermediate element 14. The intermediate element 14 is, for example, an eye-shaped terminus part, to which the limiting element 5 is attached.

FIG. 13 shows the hood hinge 1" in the region of the intermediate part 14 in the starting position A of the hood hinge 1", as shown in FIG. 11. FIG. 14 shows the hood hinge 1" in the region of the intermediate element 14 in the end position E, as shown in FIG. 12.

Due to the rotational ability of the movement element 17 in relation to the lever part 16 and the coaxial attachment of the movement element 17 with respect to the rotational axis 9, no torque caused by the limiting element 5 is transmitted to the lever part 6". This is indicated by way of example in FIG. 14 with the double arrow and the designation M=0. A torque-neutral embodiment with respect to the attachment of the limiting element 5 on the lever part 6" is thus implemented by the embodiment of the hood hinge 1".

Since only one or more exemplary embodiments were described above, it is to be clarified that in principle a variety of variations and deviations are possible. Furthermore, it is to be clarified that the described embodiments only represent examples, which do not restrict the scope of protection, the applicability, or the construction. Rather, the abstract and the described embodiments merely represent a practical introduction for a person skilled in the art, on the basis of which a person skilled in the art can arrive at at least one exemplary embodiment. In this case, it is self-evident to a person skilled in the art that various modifications can be performed with respect to the function and the arrangement of the elements described with reference to the exemplary embodiments, without deviating from the scope of the appended patent claims and the equivalents thereof.

The invention claimed is:

1. A hood hinge for a motor vehicle comprising:
a first hinge member configured to attach to a body part of the motor vehicle;
a second hinge member configured to attach to a front hood of the motor vehicle;
a lifting mechanism having a first lever rotatably coupled to the first hinge member for rotation about a first rotational axis and a second lever rotatably coupled to the second hinge member for rotation about a second rotational axis, wherein the first and second levers are rotatably coupled to each other at a third rotational axis such that the lifting mechanism is configured to position the second hinge member in relation to the first hinge member from a starting position into an end position such that the front hood is moved relative to the body part from a lowered position into a raised position; and
a traction element extending between the first and second hinge member for generating a traction force, which limits extension of the second hinge member with respect to the first hinge member, wherein the traction element is linked on a fastening element connected in a rotationally-fixed manner to the first lever, wherein the fastening element extends outwardly from one of the rotational axes of the first lever.

2. The hood hinge according to claim 1, wherein a first end of the traction element is operably coupled to the first lever at a distance from one of the rotational axes of the first lever.

3. The hood hinge according to claim 2, wherein the first end of the traction element is operably coupled to a material section of the first lever, wherein the material section extends outwardly from the first rotational axis of the first lever.

4. The hood hinge according to claim 1, wherein the traction element is operably coupled at a linkage point on the second hinge member, wherein the linkage point located between the first and third rotational axes.

5. The hood hinge according to claim 1, wherein the traction element is linked on the first lever and rotatable about the first rotational axis.

6. A hood hinge for a motor vehicle comprising:
a first hinge member configured to attach to a body part of the motor vehicle;
a second hinge member configured to attach to a front hood of the motor vehicle;
a lifting mechanism having a first lever rotatably coupled to the first hinge member for rotation about a first rotational axis and a second lever rotatably coupled to the second hinge member for rotation about a second rotational axis, wherein the first and second levers are rotatably coupled to each other at a third rotational axis such that the lifting mechanism is configured to position the second hinge member in relation to the first hinge member from a starting position into an end position such that the front hood is moved relative to the body part from a lowered position into a raised position;
a traction element extending between the first and second hinge member for generating a traction force, which limits extension of the second hinge member with respect to the first hinge member, wherein the traction element is linked on the first lever and rotatable about the first rotational axis; and
an intermediate element of the first lever is arranged coaxially with respect to the first rotational axis and the traction element is associated with a movement element, which is rotatable about the first rotational axis and at least partially encompasses the intermediate element coaxially with respect to the first rotational axis, wherein the movement element is rotatable in relation to the intermediate element.

7. The hood hinge according to claim 6, wherein the first lever, which engages the traction element, is coupled to the first hinge member.

8. The hood hinge according to claim 7, wherein the traction element is aligned on the first lever part with respect to the first rotational axis.

9. The hood hinge according to claim 8, wherein the traction element is operationally connected to the second hinge member.

10. The hood hinge according to claim 9, wherein the lifting mechanism comprises a multiple link mechanism, which is configured to pivot the front hood from the lowered position into an open position.

11. A motor vehicle comprising:
a vehicle body part;
a front hood; and
a hinge assembly having at least one hood hinge including a first hinge member attached to the vehicle body part, a second hinge member attached to the front hood, a lifting mechanism having a first lever rotatably coupled to the first hinge member for rotation about a first rotational axis and a second lever rotatably coupled to the second hinge member for rotation about a second rotational axis, and a traction element extending between the first and second hinge member for generating a traction force, which limits extension of the second hinge member with respect to the first hinge member, wherein the traction element is linked on a fastening element connected in a rotationally-fixed manner to the first lever, wherein the fastening element extends outwardly from one of the rotational axes of the first lever;
wherein the first and second levers are rotatably coupled to each other at a third rotational axis such that the lifting mechanism is configured to position the second hinge member in relation to the first hinge member from a starting position into an end position such that the front hood is moved relative to the body part from a lowered position into a raised position.

* * * * *